April 4, 1961   C. R. JARRETT   2,977,981
DIAPHRAGM VALVES

Filed Dec. 9, 1957   2 Sheets-Sheet 2

INVENTOR
Charles Roy Jarrett
BY
ATTORNEY

United States Patent Office 2,977,981
Patented Apr. 4, 1961

2,977,981

DIAPHRAGM VALVES

Charles Roy Jarrett, Grange Road, Cwmbran, Monmouthshire, England

Filed Dec. 9, 1957, Ser. No. 701,586

Claims priority, application Great Britain Dec. 7, 1956

3 Claims. (Cl. 137—553)

This invention relates to diaphragm valves having a non-rising spindle enclosed by a bonnet. In such a valve the state of opening of the valve cannot be seen from outside unless an indicator of some kind is provided.

An object of the invention is to provide means which at one and the same time not only serve as an indicator but also limit the compression which can be imposed on the diaphragm. Such limitation is highly desirable, because if excessive pressure is applied the diaphragm may be injured. If the valve is in good condition and the seating is free of deposits, a diaphragm valve can be closed with a moderate pressure on the diaphragm and if it does not close under such pressure, that is an indication that something is wrong.

The Saunders United States patent specification No. Re. 19,151 discloses a diaphragm valve having a non-rising spindle and a screwed ring on the nut portion of the diaphragm compressor, the ring serving as an adjustable stop to limit the compression of the diaphragm when the valve is closed. That valve did not have a bonnet, however, but only a stirrup. If there had been a bonnet access to the screwed ring would have been impossible without disassembling the valve. The ring was not only externally accessible but was also visible and since it moved with the compressor its position could have served as an indication to full scale, of the amount of opening of the valve.

The indicator provided by the invention is of the kind which comprises a nut working on a thread outside the bonnet and formed on or carried by the spindle, and engaging a guide rod or the like on the bonnet which prevents the nut from rotating in relation to the bonnet. Thus as the spindle is rotated the nut moves outward or inward and so serves to indicate the state of opening of the valve, the actual movement of the indicator nut bearing a ratio to the movement of the obturating member of the valve which depends on the ratio of the pitch of the thread of the indicating nut to the pitch of the spindle thread for actuating the valve; this ratio will usually represent a substantial scale reduction. In the present invention the parts are so proportioned that when the valve is closed the nut takes a seating against the end surface of the bonnet or of some part rigid therewith. It thus constitutes a satisfactory and reliable stop against further rotation of the spindle in the closing direction and if the parts are appropriately dimensioned the nut will arrive in this position when the desired degree of compression of the diaphragm is reached.

An example of such a construction is illustrated in the accompanying drawings in which Figure 1 is an elevation half in section of the complete valve in the open position.

Figure 1:
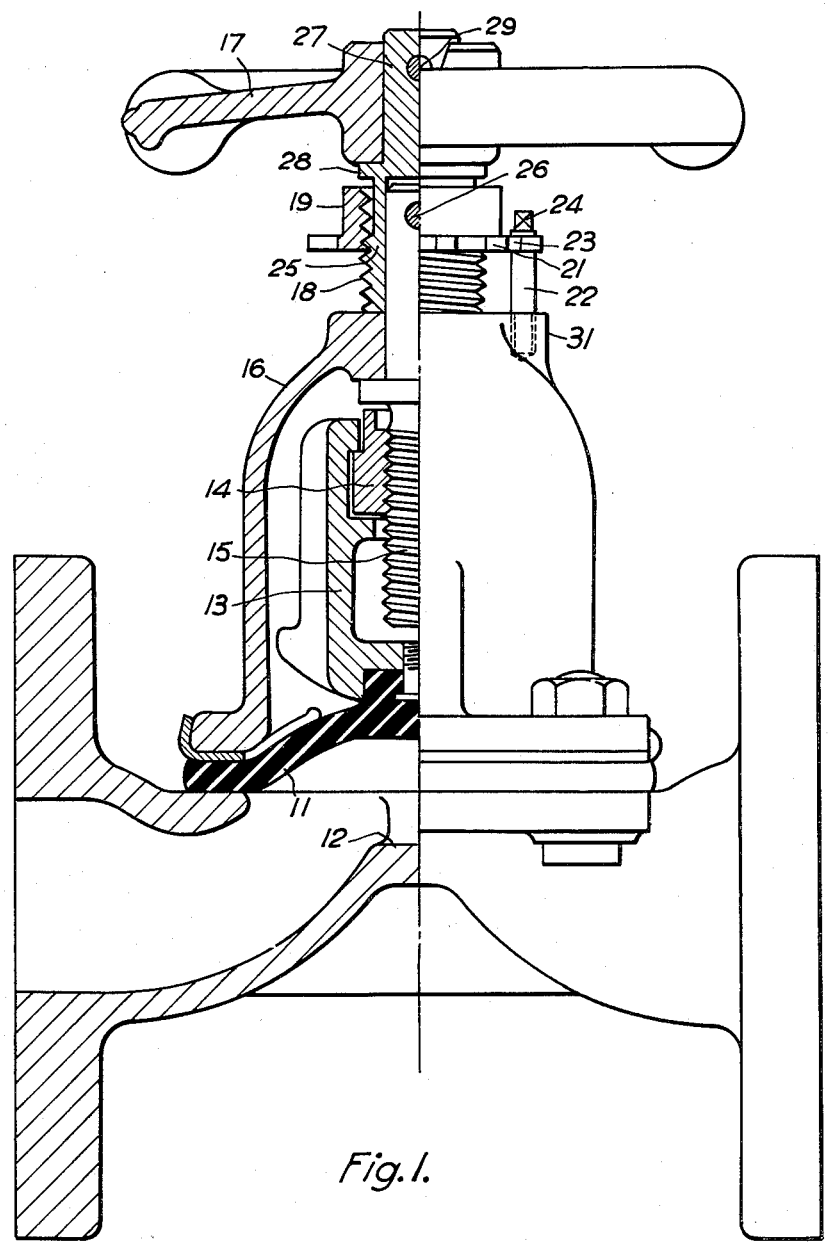
Figure 2:
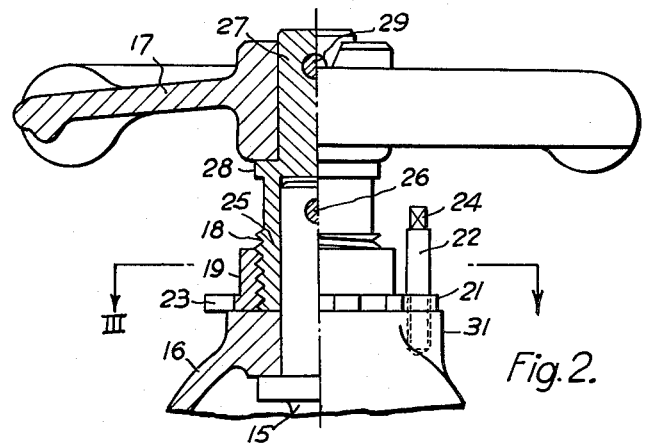
Figure 2 is a detail with the valve in the closed position.
Figure 3:
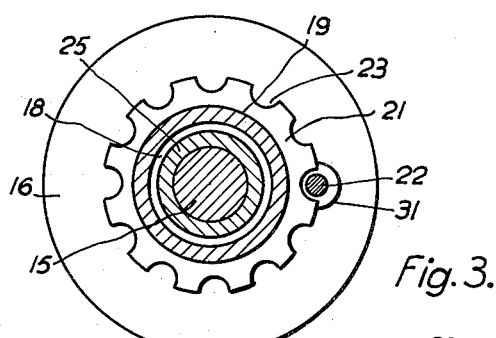
Figure 3 is a section on the line III—III of Figure 2.

Referring now to Figures 1 to 3, these show a valve having a diaphragm 11 co-operating with a weir type seating 12 and controlled by a compressor 13, which itself is moved by the aid of a nut 14, actuated by a non-rising, shouldered, threaded spindle 15, which is journalled in a bonnet 16 concealing it and is rotatable by a handwheel 17. Except for certain details which will be described below this construction is of well known form.

The invention provides a second or indicator screw thread 18 on the spindle 15 which co-operates a nut 19 having a flange 21, notched to engage a guide rod 22 projecting from the bonnet so that the nut can move axially but not rotate in relation to the bonnet. It will therefore move outwards or inwards as the spindle is rotated one way or the other. It is moreover so positioned in relation to the other parts that when the valve is open the nut 19 is spaced from the end of the bonnet, as in Figure 1, thus indicating that the valve is open, while when the valve is closed the nut has seated itself on the end face of the bonnet as in Figure 2, just when the diaphragm is under a desired degree of compression. When it butts against the face of the bonnet, resistance to further rotation is produced by the friction of the nut against the bonnet and not by the rod 22, so that the latter and the flange 21 can be of light section.

In practical manufacture, reasonable tolerances must be allowed in the dimensions of the bonnet 16, the spindle 15, the valve compressor 13 and the nut 14 which couples the compressor to the spindle. It is therefore desirable that the indicator nut 19 should be adjustable to ensure that it exerts its limiting function when an appropriate degree of compression of the diaphragm is reached. To this end, the indicator nut 19 is arranged so that it can engage the guide rod 22 or the like at any of a number of positions round the circle. Thus the flange 21 has semi-circular notches 23 at close angular intervals, the notching being at such radius that any of the notches can be brought into engagement with the guide rod. To facilitate adjustment, the outer end of the guide rod may have a square 24 or similar formation, so that it can be rapidly unscrewed from the bonnet to enable the indicator nut to be turned, and then be replaced.

Figures 1 to 3 show a particular construction which is readily adaptable to existing valves, in which the handwheel is secured to the spindle by a diametral pin, in accordance with our British patent specification No. 515,808. In applying the present invention to such a construction, a spindle extension is provided. This comprises an inner part 25 on which the thread 18 is formed and which is recessed to clear the projecting end of the valve spindle 15. This part has holes which line up with the diametral hole in the spindle so that it can be pinned on at 26 in place of the handwheel. When so pinned on, the lower end of the extension bears against the end face of the bonnet in place of the handwheel and so prevents the spindle from moving inwards in relation to the bonnet. The thread 18 extends over about a half of the length of this inner part 25 from the end which abuts the bonnet. The outer part 27 of the spindle extension is a replica of the projecting spindle end itself and there is a shoulder 28 of increased diameter at the junction of the two parts. Thus the handwheel 17 can be fitted over the outer end of the spindle extension until it seats on the shoulder 28 and then be pinned by a diametral pin 29.

A boss 31 is desirably formed at the outer end of the bonnet with a tapped hole to receive the guide rod 22 located to co-operate with one of the notches 23 in the indicator nut flange; it would be possible however to drill and tap a suitable hole in an existing bonnet without a boss if necessary. The length of the guide rod 22 is such that even when the valve is fully open, as will be seen in Figure 1, the notched flange is still in engagement with it, and the indicator nut is still engaged with the indicator thread.

By suitable choice of pitch of the indicator thread, the movement of the indicator nut can be made the same as, less than, or greater than that of the valve compressor. If desired, the guide rod may be graduated.

It will be clear that the spindle extension and indicator can be removed at any time and the handwheel refixed in the original position. However, the invention is not limited to the production of a separate spindle extension, as if desired the spindle itself can be extended and an indicator thread 18a cut in its surface, as in Figure 4.

The usual shoulder 32 on the spindle prevents the spindle from moving outwards in relation to the bonnet, while inward movement can be prevented in various ways, for example, by a ring 33 screwed on the thread 18a and locked by a grub screw 34. The ring 33 is recessed into the bonnet so that the indicator nut can butt against the bonnet to limit compression of the diaphragm, as above described. To permit access to the grub screw 34 a hole 35 may be drilled in the bonnet.

Figures 4, 5:
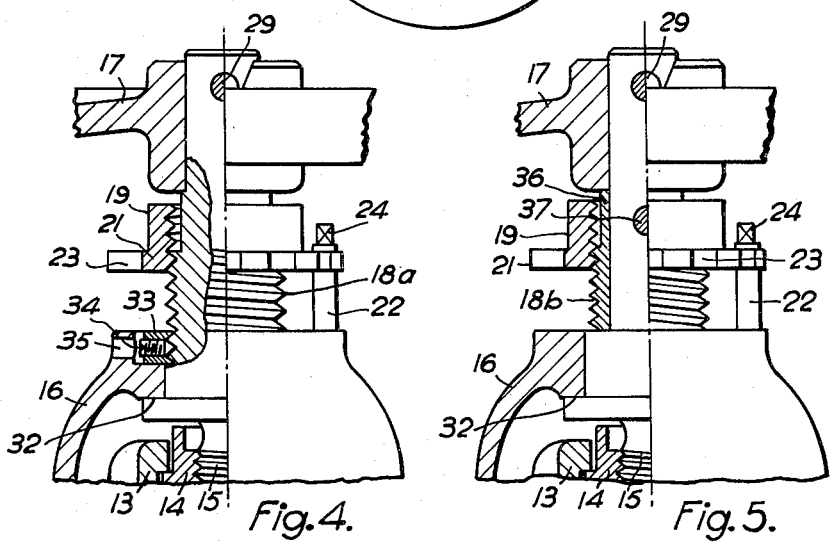
Figures 4 and 5 are details of two modifications.

Another possibility is shown in Figure 5. Here the indicator thread 18b is formed on a separate sleeve 36 which on the spindle on the inner side of the handwheel 17, the diameter of the sleeve being such that its end bears against the bonnet and thus prevents inward movement of the spindle in relation to the bonnet. To ensure that the sleeve cannot rotate in relation to the spindle, it may be pinned to the spindle as at 37. It will be clear that the sleeve 36 might instead be made integral with the handwheel.

In both Figures 4 and 5 those parts which are the same as in Figures 1 to 3 have been marked with the same reference numerals.

It will also be clear that the invention is not limited to a valve in which the handwheel is pinned on and that other ways of securing the handwheel could be used; also that the handwheel may be replaced by other like device, for instance a chain wheel.

I claim:

1. In a diaphragm valve, a non-rising spindle enclosed by a bonnet, a screw thread outside the bonnet coaxial with and fast to the spindle so as to rotate therewith, an indicator and stop device comprising an external visible indicator nut working on said thread, guide means fixed in relation to said bonnet and selectably engageable with said nut at any of a plurality of angular positions of the nut round the axis of said spindle to prevent rotation of the nut without impeding its axial movement, and a stop surface rigid with said bonnet and located to check said nut and so prevent further rotation of said spindle when the valve is closed, said guide means consisting of a rod set parallel to the valve spindle and said indicator nut includes a flange having notches at close angular intervals at such a radius that any of them can be brought into engagement with said guide rod.

2. In a diaphragm valve, a non-rising spindle enclosed by a bonnet, a screw thread outside the bonnet coaxial with and fast to the spindle so as to rotate therewith, an indicator and stop device comprising an external visible indicator nut working on said thread, guide means fixed in relation to said bonnet and selectably engageable with said nut at any of a plurality of angular positions of the nut round the axis of said spindle to prevent rotation of the nut without impeding its axial movement, a stop surface rigid with said bonnet and located to check said nut and so prevent further rotation of said spindle when the valve is closed, and a spindle extension comprising an inner portion and an outer portion, said inner portion having said screw thread formed on it and being secured to the valve spindle with its inner end bearing against the end of said bonnet and said outer portion being shaped similarly to the valve spindle, the valve also including a member for rotating the spindle secured on said outer portion.

3. A set of parts for providing an existing diaphragm valve having a non-rising spindle enclosed by a bonnet and having a spindle rotating member pinned to the spindle and bearing against the outer end of the bonnet, with an indicator and diaphragm compression limiting means, comprising a spindle extension having an inner portion and an outer portion, said inner portion having a screw thread formed on it, a recess to receive the outer end of the spindle and an aperture whereby it may be pinned to the spindle, the length of said inner portion being such that when pinned its inner end bears against the end of the bonnet, and said outer portion being shaped similarly to the valve spindle and apertured whereby the spindle rotating member may be pinned to it, an indicator nut working on said screw thread, a flange on the nut having a plurality of identical notches at close angular intervals and a guide rod attachable to the valve bonnet in a position in which it will engage one of the notches in said flange.

References Cited in the file of this patent

UNITED STATES PATENTS

| | | |
|---|---|---|
| Re. 19,151 | Saunders | May 1, 1934 |
| 1,420,664 | Maxwell | June 27, 1922 |
| 1,978,603 | Saunders | Oct. 30, 1934 |
| 2,367,651 | Stone | Jan. 16, 1945 |
| 2,407,944 | Bassett | Sept. 17, 1946 |
| 2,705,124 | Price | Mar. 29, 1955 |

FOREIGN PATENTS

| | | |
|---|---|---|
| 2,453 | Great Britain | Feb. 19, 1886 |